(12) United States Patent
Himmelmann et al.

(10) Patent No.: US 8,840,507 B2
(45) Date of Patent: Sep. 23, 2014

(54) DUAL REDUNDANT LINEAR EMA WITH HARD STOP COMPLIANT DRIVELINE

(75) Inventors: Richard A. Himmelmann, Beloit, WI (US); David J. Lang, Rockford, IL (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 886 days.

(21) Appl. No.: 12/573,248

(22) Filed: Oct. 5, 2009

(65) Prior Publication Data

US 2011/0079099 A1 Apr. 7, 2011

(51) Int. Cl.
*F16H 48/06* (2006.01)
*F16H 57/10* (2006.01)
*F16H 25/20* (2006.01)
*F16H 25/22* (2006.01)

(52) U.S. Cl.
CPC .......... *F16H 25/2015* (2013.01); *F16H 25/205* (2013.01); *F16H 25/2021* (2013.01); *F16H 25/2204* (2013.01); *F16H 2025/2087* (2013.01)
USPC .......... 475/156; 475/264; 475/343; 74/89.39; 74/89.26

(58) Field of Classification Search
USPC ......... 475/149, 150, 153, 154, 156, 263–265, 475/288, 343; 74/89.37–89.39, 89.26, 74/411.5; 188/171
See application file for complete search history.

(56) References Cited

U.S. PATENT DOCUMENTS

| | | | |
|---|---|---|---|
| 2,420,552 A * | 5/1947 | Morrill | 475/4 |
| 2,427,168 A * | 9/1947 | Thompson et al. | 475/317 |
| 4,312,191 A | 1/1982 | Biagini | |
| 4,663,985 A * | 5/1987 | Metcalf et al. | 74/661 |
| 4,745,815 A * | 5/1988 | Klopfenstein | 74/89.25 |
| 5,092,539 A | 3/1992 | Caero | |
| 5,128,688 A | 7/1992 | West | |
| 5,630,490 A * | 5/1997 | Hudson et al. | 192/223.3 |
| 5,915,507 A * | 6/1999 | Maurice et al. | 188/171 |
| 6,419,606 B1 * | 7/2002 | Tengan et al. | 475/5 |
| 6,446,519 B1 | 9/2002 | Biester | |
| 6,453,761 B1 | 9/2002 | Babinski | |
| 6,791,215 B2 | 9/2004 | Tesar | |
| 6,820,715 B2 | 11/2004 | Laurent et al. | |
| 7,098,619 B2 | 8/2006 | Stridsberg | |
| 7,190,096 B2 | 3/2007 | Blanding et al. | |
| 2005/0269887 A1 | 12/2005 | Blanding et al. | |
| 2006/0113933 A1 | 6/2006 | Blanding et al. | |
| 2006/0266146 A1 | 11/2006 | Waide | |

FOREIGN PATENT DOCUMENTS

WO 2007099333 9/2007

* cited by examiner

*Primary Examiner* — Troy Chambers
*Assistant Examiner* — Lillian Nguyen
(74) *Attorney, Agent, or Firm* — Carlson, Gaskey & Olds, P.C.

(57) ABSTRACT

An apparatus has a first motor for moving an actuator, a first brake for selectively braking the motor, a second brake that is engaged, the second brake dissipating torque spikes in the system, and a gear attaching the first motor to the actuator to cause the actuator to move and to the second brake whereby the torque spikes overcome stiction in the engaged brake so that the torque spike is dissipated in the engaged brake.

14 Claims, 1 Drawing Sheet

DUAL REDUNDANT LINEAR EMA WITH HARD STOP COMPLIANT DRIVELINE

BACKGROUND

Throughout history, engineers have used actuators to move objects providing rotary or linear motion. A rotary actuator is simply a gearing system that either increases or decreases the rotational speed of a prime mover, typically a hydraulic motor, an internal combustion engine, a turbine engine, or an electric motor, to provide a desired level of rotational speed and torque at an output. Examples of rotary actuators include: gearboxes, transmissions, differentials, Rotac® actuators, and rotary electro-mechanical actuators. Linear actuators are machines designed to provide force and linear displacement to an object. Some examples of linear actuators include: rack & pinion actuators, hydraulic rams, ball screw actuators, and crank arm actuators.

Historically, hydraulic/pneumatic motors and hydraulic/pneumatic rams have been the primary source of power for both linear and rotary actuators. Hydraulic systems offer many advantages to the designer including: high power density, accurate position control, low inertia (for high frequency response), and overload protection (via pressure relief valves).

More recently, engineers have replaced hydraulic/pneumatic actuation systems with electro-mechanical actuation systems. Electro-mechanical actuators ("EMA"), which typically include a motor, a gear box and an actuator, offer increased efficiency over their hydraulic and pneumatic counterparts and are less prone to leakage.

When designing small, high power density EMAs, a designer is faced with a problem caused by the rotational inertia associated with the EMAs electric motor. In order to create an EMA with a large force capability, the designer must create an electric motor that is capable of producing a large torque, or must create a gear train that reduces the motor's output torque requirement. If the designer chooses to create a motor with a large torque capability, its rotor will contain a significant amount of rotational inertia. If the designer chooses to utilize a gear reduction system to decrease the motor's output torque requirement, thereby reducing the motor's physical size and rotational inertia, the motor will be required to operate at a faster speed. The inertia of the motor, as felt by the output of the actuator, will be proportional to the motor's inertia multiplied by the gear reduction ratio squared.

The inertia of the EMA motor becomes extremely important when sizing the gear train and/or the actuator structure if, for instance, the actuator hits an internal stop at full speed, or if the actuated structure hits a stop at the end of its travel at full speed. In this scenario, the rotational inertia of the motor will tend to cause the actuator to continue driving through its stop, or through the structure's end stop, causing significant damage to the EMA, or its supporting structure. If the stops and structures are strong enough to maintain their integrity, the next weakest link, most likely the actuator or the gear train driving the actuator will be damaged.

Historically, the gear train and the EMA's stops are overbuilt to handle an intense torque spike associated with the rapid deceleration of the EMA's motor as the actuator hits its stops, and the internal shafting flexes as the motor spins down. This design approach tends to cause the actuator to become significantly larger and heavier than it would otherwise have to be.

Another method to handle the scenario described above is to incorporate a slip clutch in the driveline between the EMA's motor and the EMA's output. Incorporating a slip clutch in the driveline allows the EMA's output to nearly instantaneously stop, while the motor decelerates, with the stored energy of the rotating motor rotor being absorbed by the slip clutch's friction material. This type of system works well, however, it again adds components to the EMA that add size, cost, weight, and reduce the actuator's overall reliability.

SUMMARY

According to a non-limiting embodiment, an apparatus has a first motor for moving an actuator, an engaged brake for dissipating a torque spike in the EMA, and a gear attaching the motor to the actuator to cause the actuator to move and attaching to the engaged brake whereby the torque spike overcomes stiction in the engaged brake so that the torque spike is dissipated in the engaged brake.

According to a further non-limiting embodiment, an apparatus has a first motor for moving an actuator, a second motor for moving the actuator, the second motor moving the actuator upon a failure of the first motor, an engaged brake attaching to the second motor for dissipating torque spikes in the system, and a gear attaching the first and second motor to the actuator to cause the actuator to move and to the engaged brake whereby the torque spikes overcome stiction in the engaged brake so that the torque spike is dissipated in the engaged brake.

According to yet another non-limiting embodiment, an apparatus dissipates torque spike in therein and has a first motor for moving an actuator, a first brake for selectively braking the motor, a second brake that is engaged, the second brake dissipating torque spikes in the system, and a gear attaching the first motor to the actuator to cause the actuator to move and to the second brake whereby the torque spikes overcome stiction in the engaged brake so that the torque spike is dissipated in the engaged brake.

DESCRIPTION

Figure 1:
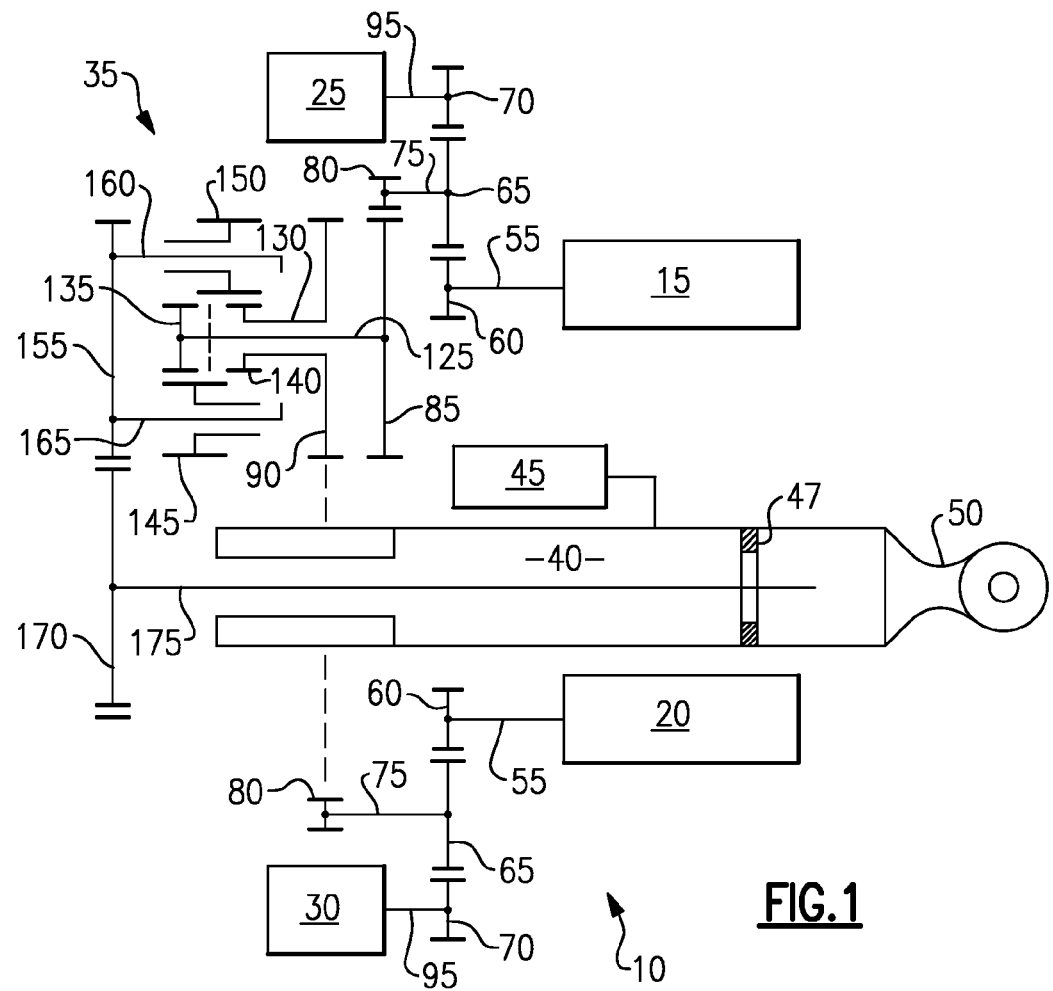
FIG. 1 is a schematic depiction of an embodiment of a dual linear EMA with a stop compliant driveline.

Referring to the Figure, a non-limiting schematic embodiment of an EMA 10 is shown. The EMA comprises a pair of motors 15, 20 a pair of brakes 25, 30 each brake being associated with a motor, a differential 35, an impeller such as linear actuator 40, such as a ball screw, a position sensor 45, and an attachment 50 that attaches to a load (not shown). The linear actuator 40 has an internal stop 47 shown as a collar.

The EMA shows a pair of motors 15, 20 because some applications require redundancy. If one motor fails, the other may be used. In this application, one motor 15 operates while the other motor 20 does not. In the non-operating motor 20, the brake 30 associated with it, is engaged in a non-energized state as will be discussed hereinbelow. If the motor 15 fails, motor 20 will then operate and the brake 30 will be disengaged in an energized state and does not provide braking torque on the motor unless desired.

Each motor is attached to the differential gear train as follows: motor output shaft 55 has a gear 60 mounted thereon that attaches to gear 65 that attaches to a brake gear 70. Gear 65 is mounted on shaft 75 that has a reduction gear 80 mounted thereon. For motor 15, the reduction gear 80 meshes to gear 85 on the differential 35. For motor 20, the reduction gear 80 meshes to gear 90 on the differential 35.

Figure 2:
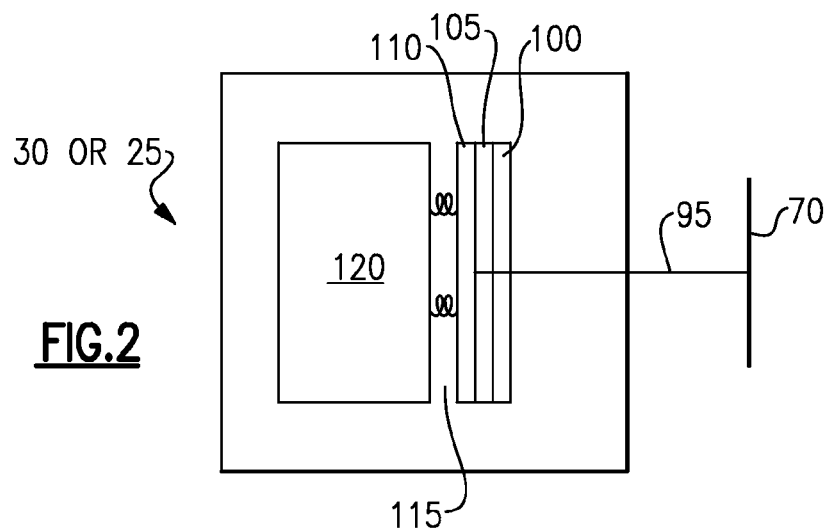
FIG. 2 is a schematic depiction of a brake utilized in the EMA of FIG. 1.

Referring to FIG. 2, for each brake, 25, 30, brake gear 70 is mounted on brake shaft 95. A brake plate 100 having friction material 105 thereon is also mounted on the shaft 95. A clapper plate 110 is urged into engagement with the friction material 105 by springs 115. If the clapper plate 110 is to be disengaged from the brake plate 100, an electromagnet 120 is actuated to overcome the force of the springs 115 to pull the clapper plate away from the brake plate 100 and the friction material 105 thereon thereby allowing shaft 95 to rotate. If a brake 25 or 30 is engaged, shaft 95 and gears 70, 65, 60 and shafts 55, 75, 95 do not usually rotate as will be discussed herein (see FIG. 1).

Referring back to FIG. 1, the differential 35 is discussed further. Gear 85 is attached to a first input shaft 125 of the differential and gear 90 is attached to a second input shaft 130 of the differential. The first input shaft 125 is attached to a first sun gear 135 and the second input shaft is attached to a second sun gear 140. The first sun gear 135 meshes with planetary gear 145 and the second sun gear 140 meshes with planetary gear 150. Planetary gear 145 drives a differential output gear 155 via shaft 165 and planetary gear 150 drives the differential output gear 155 via shaft 160. Differential output gear 155 meshes with a ball screw gear 170 to move the ball screw 40 via shaft 175 inwardly and outwardly. Also, planetary gear 145 meshes with planetary gear 150.

During operation, operating motor 15 rotates to move motor output shaft 55, gear, 60, gear 65, shaft 75, reduction gear 80, gear 85, first input shaft 125, first sun gear 135, first planetary gear 145, shaft 165, differential output gear 155, ball screw gear 170 and ball screw actuator 40. The electromagnet 120 of the brake 25 is actuated so that the clapper plate 110 is drawn away from the brake plate 100 so that shaft 95 and brake gear 70 may rotate freely as the motor operates.

While the motor 15 operates, the electromagnet 120 of the brake 30 is not actuated so that the clapper plate 110 is pushed against the brake plate 100 thereby not allowing the shaft or the gear 70 mounted thereon to rotate. If the gear 70 does not rotate the gear 65 does not rotate and the motor 20 via gear 60 and shaft 55 do not rotate. Also, if gear 65 does not rotate, reduction gear 80, gear 90, shaft 130, and second sun gear 140 do not rotate. However, because planetary gear 150 is attached to differential output gear 155 that rotates due to the motor 15 input as mentioned hereinabove, planetary gear 150 may still rotate around the second sun gear 140.

If the actuator 40 hits its internal stop 47 with motor 15 spinning at full speed, a sudden torque spike, caused by the nearly instantaneous stopping of the actuator 40, is absorbed by the EMA 10. Because gear 170 can no longer rotate to extend the linear actuator beyond the stop and the drive path provided by the motor 15 can also not continue to rotate, the kinetic energy stored in the EMA passes through the second planetary gear 150, the previously stationary second sun gear 140, shaft 130, reduction gear 80, shaft 75, gear 65, gear 70 and shaft 95 to cause clapper plate 110 and brake plate 100 of brake 30 to exceed its maximum static torque rating, e.g., that force that causes the brake and clapper plates to stick together and not rotate or stiction. As brake 30 begins to slip, the stored energy associated with motor 15 rotational speed and rotational inertia will be dissipated by the friction material 105 on brake plate 100.

The EMA illustrated in FIG. 2, utilizes the brake 30 to balance the input torque of motor 15 across the differential 35 in the event that actuator 40 hits its internal stop 47.

This EMA allows for the dual use of the differential and brake system, associated with the dual redundant architecture of the EMA, to create a lightweight, and mechanically simple mechanism that has the ability to dissipate the stored energy associated with the rotational inertia and rotational speed of the operating motor 15.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

We claim:

1. An electro-mechanical actuation system comprising;
a first motor and a second motor, wherein the first and second motor are controlled such that when said first motor is operating said second motor is not operating;
a linear actuation component connected to said first motor via a gear system and connected to said second motor via said gear system;
a brake associated with the second motor and connected to the gear system via a brake gear; and
wherein said brake is operable to dissipate a torque spike in excess of a corresponding maximum static torque rating when said brake is in an engaged position and said first motor is operating.

2. The electro-mechanical actuation system of claim 1, wherein said brake comprises:
a brake plate having a friction material thereon;
a clapper plate engaged with said brake plate when said brake is engaged and disengaged from said brake plate when said brake is disengaged;
at least one spring operable to maintain said clapper plate engaged against said brake plate via a spring force; and
an electromagnet, wherein the electromagnet is controlled to overcome said spring force when said electromagnet is activated, thereby disengaging said clapper plate from said brake plate.

3. The electro-mechanical actuation system of claim 2, wherein said brake is engaged in a non-energized state and disengaged in an energized state.

4. The electro-mechanical actuation system of claim 1, wherein the linear actuation component comprises an internal stop, and wherein said linear actuation component is configured such that continued actuation of the linear actuation component is prevented upon contact with said internal stop.

5. The electro-mechanical actuation system of claim 4, wherein said torque spike is caused by contact between said linear actuation component and said internal stop.

6. The electro-mechanical actuation system of claim 1, wherein said gear system is a gear train.

7. The electro-mechanical actuation system of claim 6, wherein said gear train includes a differential.

8. The electro-mechanical actuation system of claim 6, wherein said gear train includes a planetary gear and a sun gear.

9. The electro-mechanical actuation system of claim 1, wherein when said brake is in an engaged position, the brake is configured to slip when said torque spike is in excess of said corresponding maximum static torque rating, thereby dissipating said torque spike.

10. A method for dissipating torque spikes in an electro-mechanical actuation system comprising the steps of:

operating a first motor;

maintaining a second motor in a non-operating state, the second motor having a corresponding brake;

maintaining said brake in an engaged position;

dissipating a torque spike in excess of a maximum static torque rating of the first motor in said brake while said first motor is operating.

11. The method of claim 10, wherein maintaining said brake in said engaged position comprises maintaining said brake in a non-energized state.

12. The method of claim 11, further comprising transmitting said torque spike from said first motor to said brake through a gearing system.

13. The method of claim 10, wherein the step of dissipating a torque spike in said brake comprises allowing said brake to slip in response to the torque spike, thereby dissipating said torque spike.

14. The method of claim 10, wherein said torque spike is a torque spike resulting from a linear actuation component of the electro-mechanical actuation system contacting an internal stop.

* * * * *